Oct. 17, 1967   E. S. CHALPIN ET AL   3,346,945
LOW-COST MANUFACTURE OF FLEXIBLE TORQUE COUPLING
Original Filed March 27, 1964                3 Sheets-Sheet 1
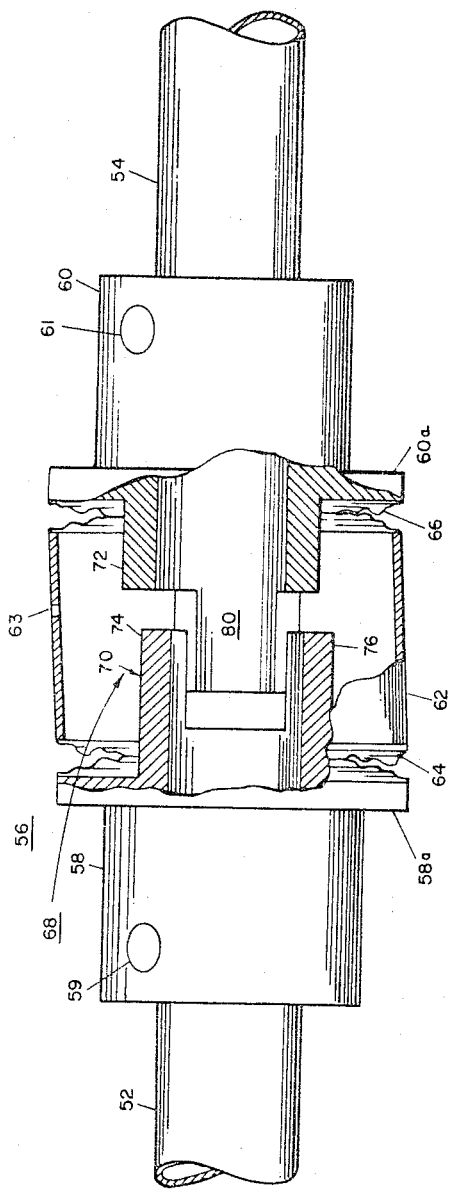
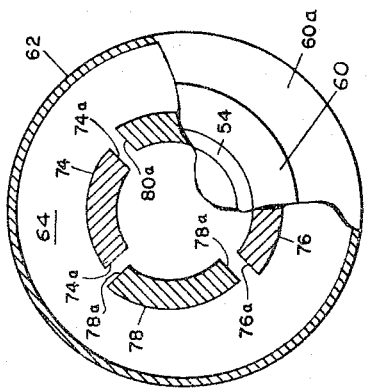
FIG. 2
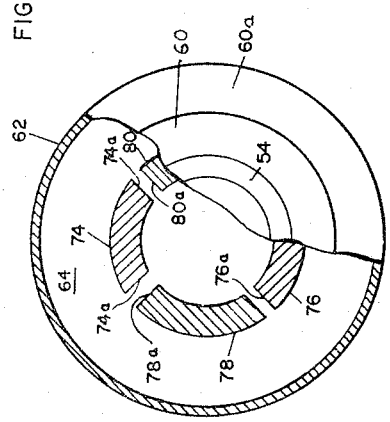
FIG. 3
FIG. 1
EDWARD S. CHALPIN
DAVID E. HANSON
INVENTORS
BY
ATTORNEYS Oct. 17, 1967 E. S. CHALPIN ET AL 3,346,945
LOW-COST MANUFACTURE OF FLEXIBLE TORQUE COUPLING
Original Filed March 27, 1964 3 Sheets-Sheet 3

EDWARD S. CHALPIN
DAVID E. HANSON
INVENTORS

BY

ATTORNEYS

United States Patent Office 3,346,945
Patented Oct. 17, 1967

3,346,945
LOW-COST MANUFACTURE OF FLEXIBLE
TORQUE COUPLING
Edward S. Chalpin, Glendora, Calif., and David E. Hanson, Brockton, Mass., assignors to Metal Bellows Corporation, Sharon, Mass.
Original application Mar. 27, 1964, Ser. No. 355,376, now Patent No. 3,301,007, dated Jan. 31, 1967. Divided and this application Apr. 29, 1966, Ser. No. 559,025
4 Claims. (Cl. 29—436)

This application is a division of application Ser. No. 355,376, filed Mar. 27, 1964, now Patent No. 3,301,007, granted Jan. 31, 1967.

This invention relates to a novel low-cost construction for a bellows coupling and comprehends a method for manufacturing it.

Flexible torque couplings of the present kind are capable of transferring torque between two shafts that are subject to independent, or differential, lateral and longitudinal motions as well as angular deflection. One construction for such shaft couplings utilizes bellows. Advantages of the bellows-type flexible torque couplings include the absence of frictional wear between elements of the coupling, and high flexibility to accommodate lateral, longitudinal, and angular misalignment. This latter feature allows the coupled shafts to be substantially misaligned and yet have minimal lateral and bending stresses.

Moreover, the full symmetry of the bellows around the axis of rotation can provide a constant speed characteristic. In addition, the bellows elements in such devices may be constructed with sufficient torsional rigidity to prevent appreciable relative rotational displacement between the coupled shafts. Put another way, the rotational movement of the driving shaft is precisely communicated to the driven shaft, since there is no inherent slack or play in the coupling.

However, the use of flexible bellows-type couplings has often been retarded due to their generally lower strength compared with other torque couplings of lesser flexibility. Specifically, although the diaphragm or bellows elements of a bellows coupling provide an extremely high strength coupling having remarkably low stress concentrations, they are subject to failure, particularly when inadvertently damaged by an external force.

Another problem with prior bellows-type couplings is their relatively high cost, which precludes their use in applications where cost is a prime consideration.

Accordingly, an object of the present invention is to provide a method of making a fail-safe torque coupling characterized by high performance prior to failure and continued operation in the event of failure.

Another object of the invention is to provide a method of making a fail-safe flexible torque coupling that has high torsional rigidity together with lateral flexibility.

Another object of the invention is to provide a method of making a fail-safe flexible torque coupling that is compact and has light weight. The coupling should also have low inertia.

A further object of the invention is to provide a method of making a bellows-type flexible torque coupling having fail-safe operation.

A further object is to provide an improved method of making a flexible shaft coupling of economical and simplified design.

It is also an object of the invention to provide a method for fabricating metal bellows couplings of the above character at low cost.

Other objects of the invention will in part be obvious and will in part appear hereinafter.

The invention accordingly comprises the features of construction, combinations of elements, and arrangements of parts which will be exemplified in the constructions hereinafter set forth, and the several steps for making these constructions and the relation of one or more of such steps with respect to each of the others, and the scope of the invention will be indicated in the claims.

For a fuller understanding of the nature and objects of the invention, reference should be had to the following detailed description taken in connection with the accompanying drawing, in which:

FIG. 1 is a side elevation view, partly broken away, of a fail-safe flexible shaft coupling embodying the invention, shown connected between misaligned shafts;

FIG. 2 is an end view, partly broken away, of the coupling of FIG. 1;

FIG. 3 is an end view, similar to FIG. 2, of the coupling of FIG. 1 with the elements thereof aligned;

Figure 4:
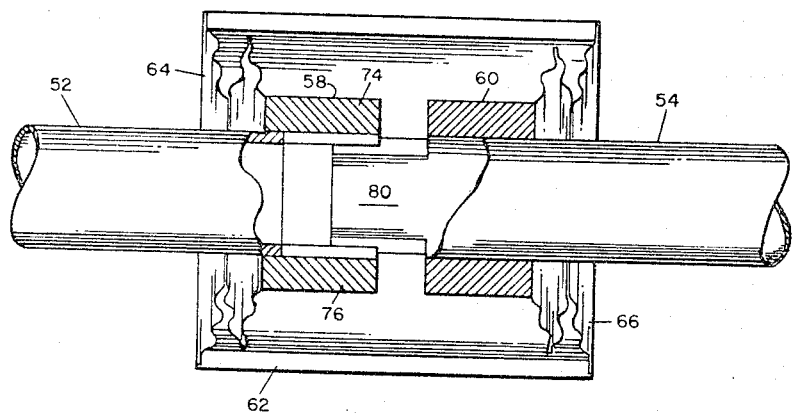
FIG. 4 is a longitudinal section of a modified construction for the coupling of FIG. 1.

A fail-safe coupling embodying the invention has a primary bellows coupling unit connecting a driving member with a driven member. Also connected between the two members, which are appropriately shaft-receiving hubs, is a secondary coupling unit. The torsional rigidity of the primary unit maintains the secondary unit disengaged so that the connection between the hubs has high flexibility, except for torsional stresses.

In the event that the primary coupling fails, or the torsional rigidity of the primary unit otherwise decreases to allow the hubs to become torsionally offset, the secondary unit engages and commences to transfer the torsional load between the hubs.

In this manner, the coupling combines the highly desirable operating characteristics of bellows-type flexible torque couplings with high reliability. The invention thus enables bellows-type couplings, with their inherent features of relatively silent, lubrication-free and non-wearing operation to be used in critical applications where safety and reliability are prime considerations. One such application is in the steering mechanism of motor vehicles.

More specifically, as shown in FIGS. 1 and 2, a coupling indicated generally at 50 interconnects shafts 52 and 54. The coupling has a primary coupling unit indicated generally at 56, connected between axially spaced, shaft-receiving hubs 58 and 60. The primary coupling unit 56, in turn, comprises an elongated, rigid cylinder 62 connected between bellows 64 and 66 that are connected at their other ends to the hub flanges 58a and 60a, respectively.

The coupling 50 also has a secondary coupling unit indicated generally at 68, comprising disengaged sections 70 and 72 connected with the hubs 58 and 60, respectively, and disposed coaxially within the cylinder 62 of the primary unit. The sections 70 and 72 are adapted to engage each other and transfer torque between the shafts 52 and 54 in the event the primary coupling unit 56 fails.

In the illustrated embodiment, a pair of opposed arcuate lugs 74 and 76, integral with the hub 58, form the section 70. The lugs 74 and 76 extend axially toward the hub 60 to interleave with an identical pair of opposed arcuate lugs 78 and 80 (FIG. 2), integral with the hub 60 and forming the coupling section 72.

As best seen in FIG. 3, where the hubs are in alignment, the lugs 74–80 are equally spaced around the circumference of a common circle with each lug of the section 70 between lugs of the section 72 and vice versa. Radially extending surfaces 74a, 76a, 78a and 80a on the lugs are circumferentially spaced from mating surfaces on adjacent lugs.

The bellows 64 and 66 are preferably of welded metal construction, with a plurality of generally frustro-conical diaphragms as shown. The diaphragms are rippled with a radial succession of circumferentially extending undulations to increase their flexibility and their resistance to buckling deformation under high torque loads.

The flanges 58a and 60a may be integral with the hubs, as shown, or formed of sheet stock and secured to the hubs as by welding or brazing. The shafts 52 and 54 are secured in the hubs 58 and 60 in a conventional manner, e.g., with pins 59 and 61.

It has also been found that the bellows-cylinder and bellows-hub connections are preferably continuous around the entire bellows periphery so that the coupling provides constant-speed operation. In the absence of continuous weld or similar connection, sufficient deformation can occur when the hubs are offset from each other to cause speed variations.

During operation, the coupling 50 efficiently transfers torque between the shafts 52 and 54 with relatively quiet and friction free operation. Moreover, the coupling has no noticeable torsional windup and hence it maintains a substantially fixed relative rotational orientation of the shafts 52 and 54, and the elements of the coupling.

The circumferential spacing between the adjacent lugs of the secondary coupling unit 68 is sufficient to prevent contact between them as long as the primary unit 56 remains intact. Such contact would decrease the coupling's flexibility and hence its misalignment accommodation, in addition to producing some noise and wear during operation.

Accordingly, when the shafts 52 and 54 are in the position of maximum lateral misalignment, as shown in FIGS. 1 and 3, the lugs 74 and 76 of the coupling section 70 are still disengaged from the lugs 78 and 80. However, if the primary coupling unit 56 fails, the adjacent lugs of the two couplings section 70 and 72 will undergo relative rotation and thus engage each other and continue to transfer torque between the hubs 58 and 60 and the shafts connected thereto. It will also be seen that when the secondary coupling unit is brought into action by failure of the primary unit, the coupling 50 still accommodates misalignment of the coupled shafts 52 and 54, although not with the same high efficiency and flexibility it had prior to such failure.

The construction of the coupling 50 shown in FIG. 1 provides a high degree of protection for the relatively fragile bellows 64 and 66, since the outer radial dimensions of the cylinder 62 and hub flanges 58a and 60a are at least as large as the bellows, and hence shield the bellows from inadvertent damage. Moreover, even with added parts, the coupling has low inertia and small size.

FIG. 4 shows an alternative construction for the fail-safe coupling and comprises the same elements as the coupling 50. However, in FIG. 4, the bellows 64 and 66 and the hubs 58 and 60 are disposed within the cylinder 62 rather than axially spaced therefrom as in FIG. 1. Further, the coupling of FIG. 4 does not have hub flanges.

In the couplings described above, the cylinder between the bellows may be replaced with other shaft-like torque-transferring structures. It should also be noted that the interior of the coupling is vented through a hole 63 (FIG. 1) in the cylinder 62 to have the same pressure as the environment.

Figure 5:
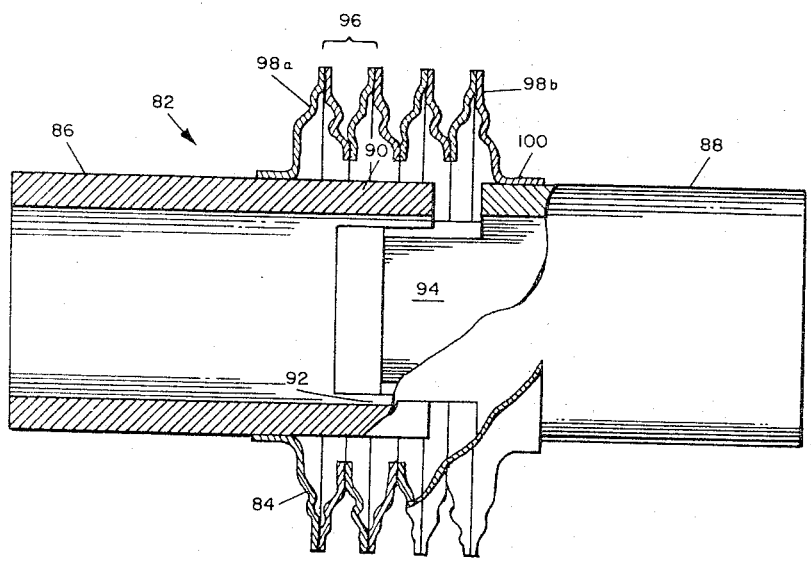
FIG. 5 is a side view, partly broken away, of a low cost shaft coupling embodying the invention.

As shown in FIG. 5, the fail-safe features of the invention are also suited for use in a single-bellows coupling. A coupling indicated generally at 82 includes a bellows 84 interconnecting axially-spaced cylindrical hubs 86 and 88. The hub 86 has lugs 90 and 92 interleaved with lugs 94 and 96 of the hub 88.

The bellows 84 preferably comprises a plurality of convolutions 96, each formed with a pair of rippled frustroconical diaphragms 98 arranged back to back and welded together at their inner rims. The convolutions are joined by welding together the mating outer rims of adjacent diaphragms. The end diaphragms 98a and 98b have axially extending inner rims 100 permanently joined with the hubs 86 and 88, by welding, brazing, or a suitable cement such as an epoxy.

Still considering FIG. 5, the single-bellows coupling 82 may also be constructed with annular flanges (not shown) on each of the hubs 86 and 88 and preferably having a diameter at least as great as the outer diameter of the bellows 84. Such flanges will largely protect the bellows 84 from inadvertent damage. When protective flanges are thus provided, the bellows 84 may remain secured to the hubs as shown, or have its outer end rims secured to the flanges in a manner similar to that shown in FIG. 1.

Figure 6:
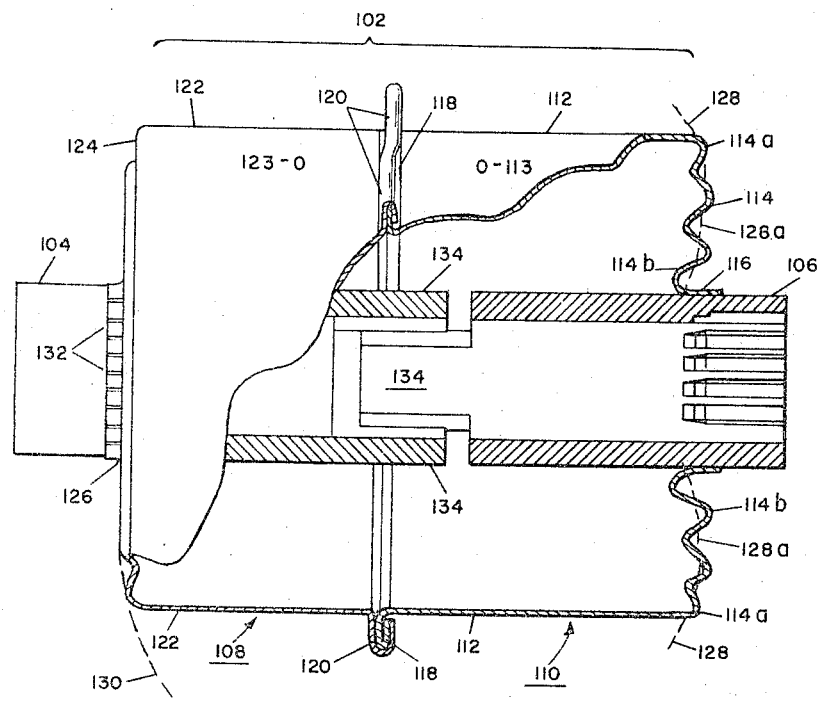

FIG. 6 shows a coupling embodying the invention and characterized by a low-cost construction and high performance. The coupling comprises a two-piece bellows unit 102 interconnecting axially spaced tubular hubs 104 and 106. Two preferably identical cups 108 and 110 constitute the bellows unit 102. The cup 110 has a cylindrical wall 112 and is bottomed with a bellows diaphragm 114. The diaphragm 114 has an inner cylindrical rim 116 secured to the hub 106. The cup wall 112 flares out and forms an annular rim 118 that is secured to a mating rim 120 flaring out from the wall 122 of the cup 108. The cup 108 also has a bellows diaphragm 124 terminating at its inner edge in a cylindrical rim 126 secured to the hub 104. The cups have vent holes 113 and 123.

As also shown in FIG. 6, the bellows diaphragms 114 and 124 are preferably rippled with a radial succession of circumferential undulations. As shown on the diaphragm 114, the radially outermost undulation 114a has a relatively large curvature; that is, a relatively small radius of curvature. The curvature of the undulations successively decreases in the direction of decreasing radius, so that the inner undulation 114b has a relatively small curvature. Thus, the axial amplitude of the undulations and the widths thereof in the radial direction increase in the direction of decreasing radius. This rippling construction with decreasing curvature appears to distribute stresses fairly evenly along the radial dimension of the diaphragm, thereby minimizing stress concentrations.

Figure 6A:
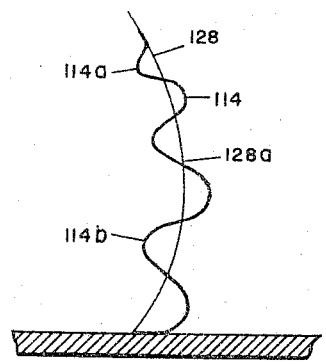

The diaphragm 114 is also radially bowed along a curve 128, with the rippling undulations superimposed on the curve as indicated in greater detail in FIG. 6A. It has been found that such bowing of the diaphragm increases its flexibility, particularly in the axial direction, and increases the operating life of the bellows unit.

The center of curvature of the curve 128 preferably lies between the wall 112 and the inner rim 116. Thus, the curve is double-valued in the radial direction and has a "crest" 128a intermediate the inner rim 116 and the outer wall 112.

The diaphragm 124 is preferably identical to the diaphragm 114 and bowed opposite to the diaphragm 114 along a curve 130 identical to the curve 128.

The cups 108 and 110 of the coupling 102 are readily fabricated at low cost from sheet stock by a conventional drawing operation. Since the cups 108 and 110 are identical, they can be formed with the same dies. The drawing operation forms both rims (e.g. 116 and 118) and the diaphragm. Thereafter, the cups are axially positioned on the hubs 104 and 106 and secured thereto. By way of example, this may be done by seam welding, in which a series of spaced axial lines welds 132, shown uniting the rim 126 with the hub 104, are rapidly formed about the periphery of the rims. One construction for seam welding apparatus utilizes a toothed wheel as the welding electrode. The welding voltage is applied between the hub and the tooth wheel and as the wheel is "rolled" around the rim 126, it draws an arc between each tooth of the wheel and the rim to form the line weld. Other welding or brazing techniques can alternatively be used to secure the cups to the hubs. However, we have found it preferable to accomplish the desired banding by means of adhesives such as epoxy, which provide uniform stress concentration in the cups all the way around the hubs 104 and 106.

The rims 118 and 120 of the cups 108 and 110, respectively, are then joined together. In the illustrated embodiment, they are rolled and crimped. Adjacent, circumferentially-spaced sections of the abutting rims are crimped and offset in opposite axial directions, so that the conjoined rims 118 and 120 form an axially undulating path, as shown. This construction, readily performed with conventional equipment, prevents the cups from slipping with respect to each other, even under high torque loads.

The coupling structure of FIG. 6 may incorporate a second coupling unit for fail-safe operation. For this purpose, in the illustrated embodiment, the hubs 104 and 106 are formed with pairs of opposed interfitting lugs 134 similar to those disclosed above with reference to FIGS. 1, 2 and 3.

The hubs 104 and 106 are fabricated from conventional tube stock and the fail-safe coupling lugs are automatically formed by removing the tube portions between the lugs on each hub. This operation is readily adapted to mass-production techniques such as punching, etc.

The shaft-receiving ends of the hubs may be broached to form splines, as shown at 132 on the hub 106, which securely engage shafts fitted therein.

When the coupling 102 does not have the fail-safe lugs 134, the cups 108 and 110 can be very shallow, with short walls 112 and 122.

The high performance, strength, ruggedness and reliability, and the low cost of the coupling shown in FIG. 6 renders it highly suited for many applications, one of which is as a universal connection in a drive shaft.

The invention thus provides a flexible shaft coupling in which the fragile metallic bellows elements are effectively protected from damage. This is accomplished in a simple and ingenious manner by providing an elongated cylinder of sufficient size to extend radially beyond the bellows affixed thereto. By this arrangement, the cylinder effectively absorbs the impact of accidental blows, thereby preventing damage to the bellows.

The fail-safe bellows shaft couplings described above also provide a remarkably high degree of reliability without interfering with their high misalignment flexibility. Moreover, the low cost and light weight embodiment described above overcomes substantial practical problems that heretofore have precluded the use of low-noise frictionless and lubrication-free bellows couplings in many machines.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:
1. A method for fabricating a flexible torque coupling, said method comprising the steps of
  (A) forming a metal sheet into a cup having a flexible diaphram extending radially along the cup bottom and a tubular wall extending axially along the cup wall from the outer periphery of said diaphragm to a first edge,
  (B) providing torque-transferring means on each diaphragm radially spaced inwardly from its outer periphery,
  (C) securing together said first edges of first and second cups disposed in opposition to each other so that said torque-transferring means on said two cups are axially spaced apart.

2. The method defined in claim 1 in which said cup-forming step forms each of said diaphragms with an axial bow and with radially-spaced undulations.

3. The method defined in claim 1
  (A) in which said torque-transferring means is formed as a cylindrical shaft-receiving rim, and
  (B) further comprising the step of securing first and second hubs in said shaft-receiving rims of said first and second cups, respectively, prior to securing said cups together.

4. A method for fabricating a fail-safe flexible torque coupling comprising the steps of
  (A) forming a metal sheet into a cup having
    (1) a cylindrical torque-transferring inner rim forming an axially-centered hole in the cup bottom,
    (2) a flexible diaphragm extending radially outwardly from said inner rim, and
    (3) a cylindrical cup wall extending axially from the outer periphery of said diaphragm to an annular flange,
  (B) forming a tubular hub having at least two arcuate axially-extending lugs at a first end thereof,
  (C) securing said inner cylindrical rim of said cup to said hub to form a cup-hub assembly with said lugs being within the cup wall and extending axially beyond said annular rim, and
  (D) securing together said outer annular rims of two cup-hub assemblies with their lugs interleaved and circumferentially spaced apart.

References Cited
UNITED STATES PATENTS

| | | | |
|---|---|---|---|
| 1,471,143 | 10/1923 | Cromwell | 64—15 |
| 1,752,106 | 3/1930 | Persons | 64—13 |
| 1,842,149 | 1/1932 | Clifford | 29—454 XR |
| 2,069,727 | 2/1937 | Spencer | 29—454 XR |
| 3,000,089 | 9/1961 | Baker et al. | 29—436 |
| 3,046,759 | 7/1962 | Deford et al. | 64—11 |
| 3,099,879 | 8/1963 | Horovitz | 29—436 |

FOREIGN PATENTS

| | | |
|---|---|---|
| 923,640 | 2/1955 | Germany. |

JOHN F. CAMPBELL, *Primary Examiner.*
THOMAS H. EAGER, *Examiner.*